United States Patent [19]

Maddalena

[11] Patent Number: 4,616,215

[45] Date of Patent: Oct. 7, 1986

[54] VACUUM MONITORING AND SIGNALING APPARATUS

[75] Inventor: Richard E. Maddalena, Petaluma, Calif.

[73] Assignee: Maddalena's, Inc., Petaluma, Calif.

[21] Appl. No.: 636,150

[22] Filed: Jul. 31, 1984

[51] Int. Cl.[4] .................. G08B 21/00; A01J 7/00; F16K 37/00
[52] U.S. Cl. ..................... 340/626; 119/14.14; 137/557
[58] Field of Search ............... 340/626, 605, 606, 611, 340/614, 573, 684; 119/14.14, 14.44; 137/490, 494, 526, 557; 200/144 B; 73/753-754

[56] References Cited

U.S. PATENT DOCUMENTS

| | | | |
|---|---|---|---|
| 3,864,960 | 2/1975 | Fletcher et al. | 340/605 X |
| 4,106,002 | 8/1978 | Hogue, Jr. | 340/626 |
| 4,163,130 | 7/1979 | Kubota et al. | 200/144 B |
| 4,182,344 | 1/1980 | Benson | 340/626 X |
| 4,298,863 | 11/1981 | Natitus et al. | 340/626 X |
| 4,356,055 | 10/1982 | Montier | 73/37 X |
| 4,398,187 | 8/1983 | Fukushima et al. | 340/626 |
| 4,402,224 | 9/1983 | Fukushima | 340/626 X |
| 4,403,124 | 9/1983 | Perkins et al. | 200/144 B |
| 4,440,995 | 4/1984 | Lange et al. | 200/144 B |

FOREIGN PATENT DOCUMENTS

| | | |
|---|---|---|
| 40918 | 2/1981 | European Pat. Off. |
| 2714942 | 12/1977 | Fed. Rep. of Germany |
| 604295 | 9/1978 | Switzerland |
| 607655 | 9/1978 | Switzerland |

OTHER PUBLICATIONS

"Experimenting with an Air Pressure Switch", *Popular Electronics*, Sep. 1981.

*Primary Examiner*—Glen R. Swann, III
*Assistant Examiner*—Thomas J. Mullen, Jr.
*Attorney, Agent, or Firm*—Flehr, Hohbach, Test, Albritton & Herbert

[57] ABSTRACT

Vacuum monitoring apparatus which includes a control circuit having transducer means for sensing the vacuum levels in a system and generating output signals. The control circuit includes adjustment circuits which compare the transducer output with selectively variable reference signals for controlling indicator devices and an alarm circuit when the vacuum levels are at respective high, low and normal settings. An off adjustment circuit is provided for setting the vacuum level below which the alarm circuit is disabled. A time delay circuit disables the alarm circuit for a predetermined time delay to provide for measurement of the vacuum recovery rate for the system.

19 Claims, 8 Drawing Figures

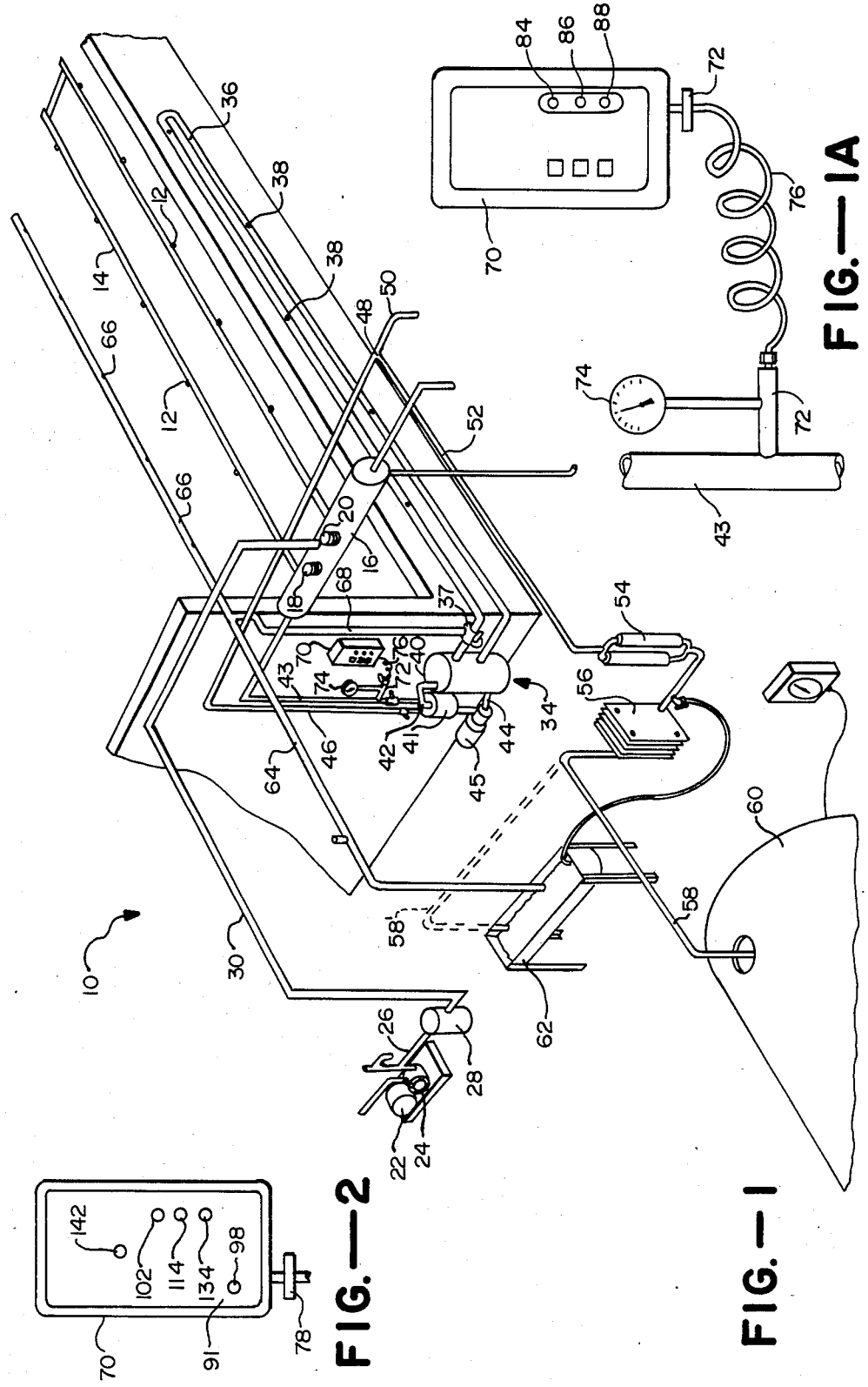

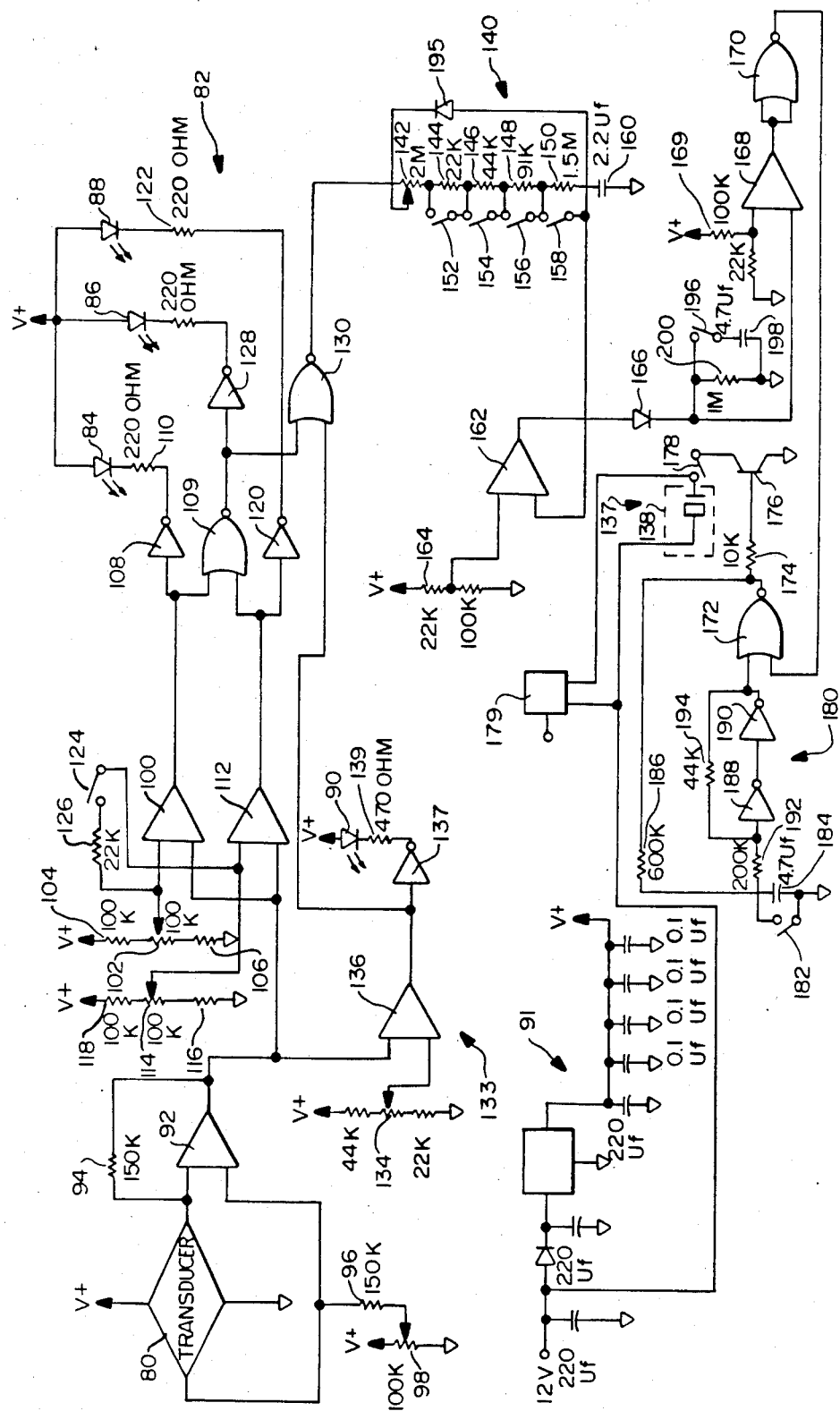
FIG.—3

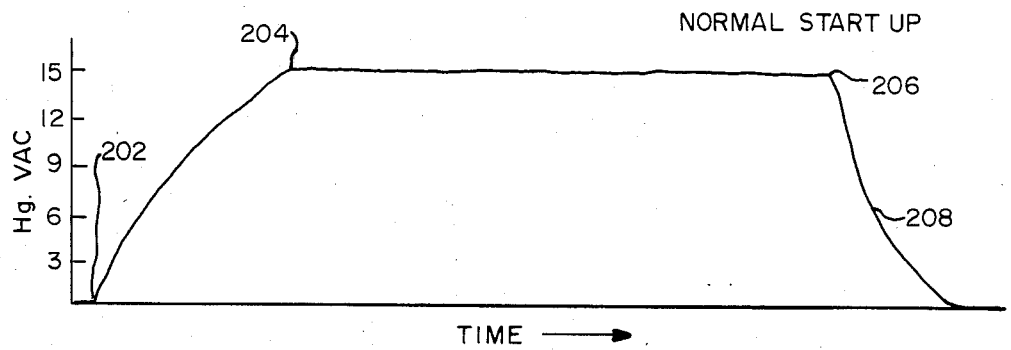
FIG.—4
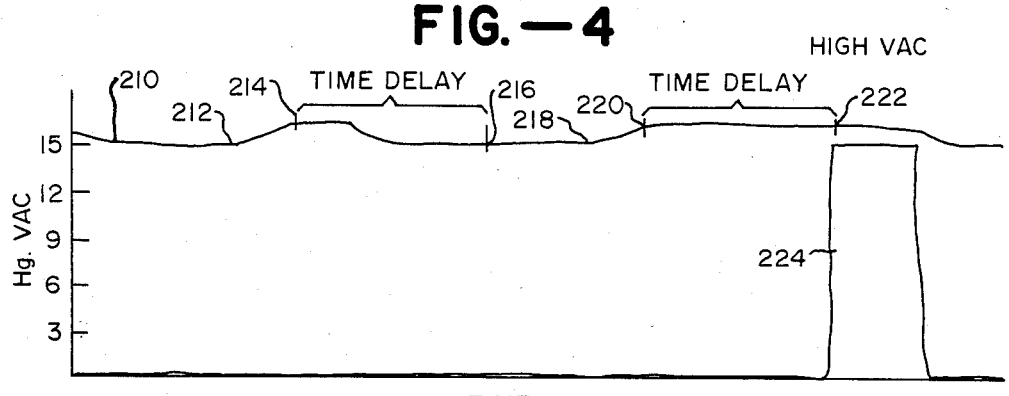
FIG.—5
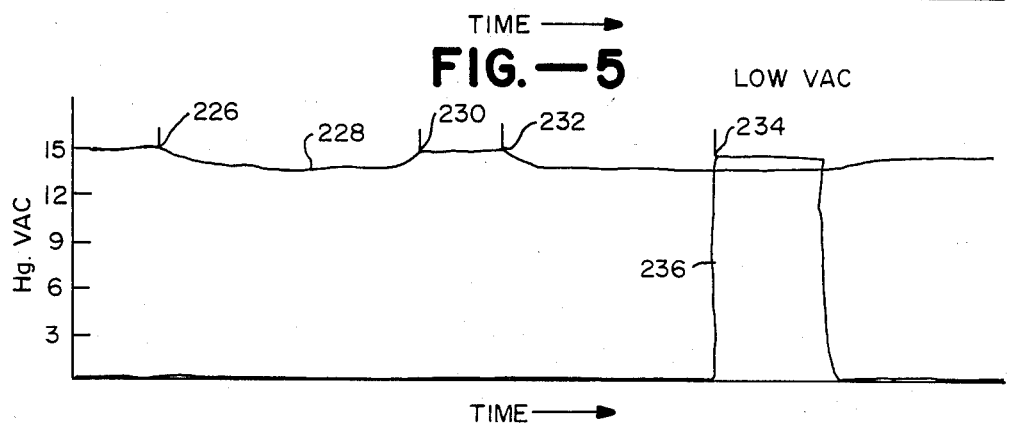
FIG.—6
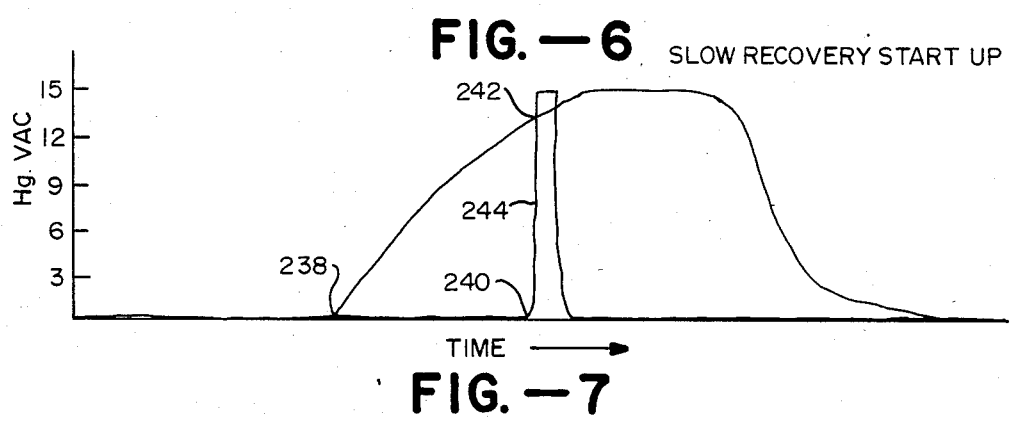
FIG.—7

VACUUM MONITORING AND SIGNALING APPARATUS

This invention relates to systems employing vacuum, and in particular relates to systems for monitoring vacuum conditions and providing warning indicators or alarms when the vacuum levels or recovery rates are outside desired values and ranges.

Many different systems and equipment employ vacuum in their operating cycles. Among these are modern milk barns which connect a number of vacuum-operated milking machines to a common source of vacuum. Other systems include medical respirators as well as electrical devices such as vacuum circuit interrupters in which the dielectric property of vacuum is employed in the operation of an electrical circuit.

In many of these vacuum systems there is a requirement to control pressure in the system so that the vacuum levels stay within the predetermined limits for proper operation. For example in milk barns it is desirable to maintain the vacuum level in the milking machine to a range of from about 12" Hg. to 13.5" Hg. vacuum. Where cows are milked using vacuum systems, pressure levels below about 12" Hg. or above 13.5" Hg. vacuum create stress on the teats which can result in injury to the animal and resulting loss of milk production.

Heretofore the desired control of vacuum levels in milk barns and other vacuum systems has not been completely successful. Conventional vacuum regulators employed in these systems are subject to malfunction and require periodic maintenance which leads to system downtime. The operator must also closely observe the vacuum regulators and gauges. If these gauges or regulators are neglected and abnormal vacuum levels are reached then damage to equipment or injury to animals can result. Other factors contributing to improper control of vacuum levels are inefficient vacuum pumps, air leaks or obstructions in the vacuum lines, faulty or inoperable air injectors, and hoses or fittings which may be inadvertently disconnected.

Accordingly, it is an object of the present invention to provide new and improved vacuum monitoring and signaling apparatus which obviates and reduces many of the problems and limitations of conventional vacuum systems.

Another object is to provide a vacuum monitoring apparatus which signals when the vacuum level is above or below predetermined limits.

Another object is to provide a vacuum monitoring system of the type described which signals when the recovery time of vacuum buildup exceeds a predetermined limit.

Another object is to provide a vacuum monitoring system of the type described which includes visual and audible alarm circuits that are activated when the vacuum levels are outside and the desired range for predetermined time periods.

Another object is to provide a vacuum monitoring system of the type described which facilitates rapid and accurate adjustment of the vacuum levels being monitored.

The invention in summary provides vacuum monitoring apparatus which includes a control circuit having a transducer for sensing the instantaneous level of vacuum and generating an output signal, an adjustment circuit for selectively establishing reference signals proportional to respective predetermined upper and lower limits of vacuum, a comparator circuit for comparing the output signal with the reference signals to establish control signals, an off adjustment circuit including another comparator circuit for establishing another control signal, an indicator circuit for signaling abnormal vacuum conditions responsive to the respective control signals, and a time delay circuit including means for disabling the indicator circuit for a predetermined delay time following initiation of the control signals.

The foregoing and additional objects and features of the invention will appear from the following specification in which the invention has been described in conjunction with the accompanying drawings.

FIG. 1 is a schematic view of a typical milk barn installation incorporating a preferred embodiment of the vacuum monitoring apparatus of the invention.

FIG. 1A is an enlarged front elevation view of the housing for the control circuit of the invention utilized in FIG. 1.

FIG. 2 is an enlarged rear elevation view of the housing of FIG. 1A with the cover off.

FIG. 3 is a schematic diagram of the control circuit of the invention.

FIG. 4 is a chart plotting vacuum level as a function of time during normal startup of the vacuum system of FIG. 1.

FIG. 5 is a chart plotting vacuum level as a function of time illustrating operation of the invention during high vacuum conditions of the system of FIG. 1.

FIG. 6 is a chart plotting vacuum level as a function of time illustrating low vacuum conditions of the system of FIG. 1.

FIG. 7 is a chart plotting vacuum level as a function of time illustrating a slow recovery condition of the system of FIG. 1.

The schematic drawing of FIG. 1 illustrates generally at 10 a milking system employing a preferred embodiment of the vacuum monitoring apparatus in accordance with the present invention. While the invention is illustrated in relation to a milking system, it is understood that the invention can be utilized in other systems in which it is desirable to monitor vacuum conditions, for example monitoring the vacuum supply in medical respirators.

Milking system 10 is installed in a milk barn operation having a plurality of vacuum-operated milking machines, not shown, in individual stalls. The source of vacuum is provided to the milking machines through vacuum lines, not shown, connected by fittings 12 into a manifold supply comprising the pulsator line 14 mounted above and extending along the milk stalls. The two ends of the pulsator line are connected into a balance tank 16 which mounts a pair of vacuum regulators 18, 20. The vacuum regulators are conventional and operate to sense sub-atmospheric pressure within tank 16 and admit ambient air on demand to maintain the preset vacuum levels.

As used herein the term "high" when used in reference to vacuum levels or conditions means a relatively low sub-atmospheric pressure (i.e. low absolute pressure) and the term "low" correspondingly means a relatively high sub-atmospheric pressure (i.e. high absolute pressure). Similarly, as used herein reference to a vacuum level being "above" a certain level or limit means a relatively lower absolute pressure and reference to a vacuum level being "below" a certain level or limit means a relatively higher absolute pressure.

The vacuum source includes a motor 22 which powers a vacuum pump 24 drawing air through line 26 from an interceptor or air filter 28. The air filter is connected through vacuum supply line 30 with balance tank 16.

Milk collection and pumping apparatus shown generally at 34 is provided to receive milk from the milk machines in the series of stalls along one side of the pulsator line. Another similar milk receiving and pumping apparatus, not shown for purposes of clarity, is provided in the installation for collecting the milk from the machines in the series of stalls along the opposite side of the pulsator line. Milk receiver and pumping apparatus 34 includes a milk line under vacuum 36 extending along the first series of stalls. The milk line is mounted at a uniform downward slope on the order $1\frac{1}{2}''/10$ feet so that milks flows by gravity away from the machines. Feed lines, not shown, deliver milk from the machines into fittings 38 provided at intervals along the milk line. A threeway valve 37 is connected to one branch of the milk line, and the two outlet ends of the milk line are connected into a milk receiver 40. An outlet line 44 from the receiver connects into a milk pump 45 which pumps the milk upwardly through a branch line 46. The line 46 is joined through a Tee connection 48 with the branch line 50 from the other milk receiver and pumping apparatus. The two branch lines feed through the Tee into delivery line 52 which directs milk through in-line filters 54 and then through plate cooler unit 56. An outlet line 58 feeds milk from the cooler into the inlet opening of a large capacity milk tank 60.

The outlet line 58 can be pivoted to the alternate position 58' for returning water to a wash tank 62 during a cleaning-wash cycle. Wash water is drawn by vacuum from tank 62 through line 64 which extends along the first series of stalls. Fittings 66 are provided in line 64 for connecting with hoses, not shown, feeding the wash water to the individual milk machines. Wash water is drawn by vacuum from the machines through milk line 36 and receiver 34 from which it is pumped into milk delivery line 52, filters 54, cooler 56, and line 58' into tank 62. In this cycle three-way valve 37 is thrown to close off branch line 68 which leads from wash line 64.

The vacuum monitoring apparatus of the invention is contained within housing 70 which is mounted at a level above the vacuum pickup point. In the illustrated embodiment this pickup point is in a branch line 72 connected to vacuum line 43 leading from the balance tank into trap 41 of the milk receiver. A vacuum gauge 74 is also connected into the branch line 72. A flexible conduit 76 connected to the branch line leads into a filter 78 which in turn leads into housing 70 for connection with a pressure/voltage transducer 80 in the control circuit 82 of FIG. 3.

The front panel of housing 70 includes indicator lights 84, 86, and 88, preferably LED lights, which are activated by the control circuit in accordance with vacuum conditions sensed in the vacuum line 43. Preferably indicator light 84 is red to warn of a high vacuum level condition, light 88 is yellow to warn of a low vacuum level, light 86 is green to indicate normal vacuum conditions, and light 90, which is located inside the housing, indicates an alarm off condition. As shown in FIG. 2, with the cover of housing 70 off access is provided to trim pots 98, 102, 114, 134 and 142 for adjusting the circuit functions in a manner explained below.

In control circuit 82 of FIG. 3 a suitable power supply circuit 91 is provided to operate the circuit elements, lights and buzzer 138. The control circuit includes transducer 80 which generates an output voltage or signal proportional to absolute pressure in the vacuum line. The output voltage is directed into amplifier 92, with amplification limited by resistor 94.

A circuit including resistor 96 and trim pot 98 is connected to the positive output of transducer 80 for setting the offset range which is the desired vacuum range which is to be monitored. In the illustrated embodiment for the milking system, the circuit is set to provide a 7" Hg. offset range, for example from 10" to 17" Hg. vacuum. Adjustment of trim pot 98 moves the range up or down, as desired, e.g. to a new setting of from 12" to 19" Hg. The amplified output voltage from amplifier 92 is directed into three adjustment or comparator circuits for selectively adjusting the "High," "Low" and "Off" conditions of operation.

The adjustment circuit for the "High" condition includes an operational amplifier 100 which acts as a comparator amplifier. The amplifier 100 has one input connected with the output of amplifier 92 and another input connected with the slide of a trim pot 102. Resistors 104, 106 increase the accuracy of the trim pot setting which establishes the "High" reference voltage or signal. When the transducer output reaches a value above the "High" reference voltage, then amplifier 100 is activated so that its output of 8+ volts is directed into an inverting buffer 108 as well as one input of NOR gate 109. The output of the inverting buffer thereby produces 0 volts causing current to flow from voltage source 91 through red-colored LED 84 and resistor 110. The emitted red light provides a warning to the operator that the vacuum level is too high.

The "Low" adjustment circuit includes an operational amplifier 112 having one input connected with the output from amplifier 92 and another input connected with the slide of a trim pot 114. Resistors 116, 118 triple the accuracy of the setting of this trim pot. When the transducer output voltage falls below the setting of trim pot 114 then amplifier 112 produces an output signal of 8+ volts into the second input lead of NOR gate 109 and also into the input of an inverting buffer 120. The output of this inverting buffer is thereby changed to 0 volts so that current flows through yellow LED 88 and resistor 122. The yellow light which is emitted warns the operator that the pressure in the vacuum line is too low. The NOR gate 109 now gives a low output.

A manual "vacuum level set" switch 124 is connected in series with a resistor 126 between the two slide connections of trim pots 102 and 114. With switch 124 closed the vacuum range is narrowed to facilitate adjustment of the vacuum regulator to a precise level intermediate the range. For example, assuming the high and low points are set as 13" and 14" Hg. vacuum, respectively, when switch 124 is open, the range is narrowed to 13.4" and 13.6" Hg. when switch 124 is closed.

Normal vacuum conditions are indicated when green LED 86 is activated. This occurs when the transducer output is below the "High" reference signal and above the "Low" reference signal. In this case the outputs from amplifiers 100 and 112 are off so that both red and yellow LEDs 84 and 88 are off. The output from NOR gate 109 is triggered to produce 8+ volts which is directed into the input of an inverting buffer 128 as well as one input of another NOR gate 130. This voltage signal causes the output of inverting buffer 128 to produce 0 volts so that current flows through green LED 86 and a resistor 132. The green light which is emitted indicates that the vacuum level is within the desired range of operation. When vacuum level set switch 124 is closed as described above, illumination of the green light also indicates to the operator when the regulators 18 and 20 are set to operate within the desired narrow range. If either a "High" or "Low" vacuum is sensed then the output of NOR gate 109 goes low and buffer 128 output goes high, thereby turning LED 86 off. The low output from gate 109 is also directed into one input of NOR gate 130.

An alarm-enable circuit 133 is provided for establishing an initial level of vacuum below which the alarm circuits are disabled. This is the "Off" control setting, and the circuit 133 includes a trim pot 134 the slide of which provides a reference voltage or signal through a line connected with one input of an operational amplifier 136. The other input of amplifier 136 is connected with the amplified transducer output from amplifier 92. Amplifier 136 compares the input voltages and when the amplified transducer output is greater than the reference signal from trim pot 134 the output of amplifier 136 drops to a low signal which is directed into the other input of NOR gate 130. With a low input present from NOR gate 109 the low signal from amplifier 136 moves the output of NOR gate 130 into a positive voltage to "enable" an audible alarm circuit 137 which includes buzzer device 138. The output of amplifier 136 also connects through an inverting buffer 137 and resistor 139 to operate LED light 90 for indicating the "Off" condition. This occurs when the output of buffer 137 drops low as amplifier 136 output goes high.

In the audible alarm circuit 137 a time delay circuit 140 is provided which includes trim pot 142, one lead of which is connected with the output of NOR gate 130 and the other lead of which couples with four series-connected resistors 144-150 of different resistance values, e.g. resistor 144 of 22 K Ohm, resistor 146 of 44 K Ohm, resistor 148 of 91 K Ohm and resistor 150 of 1.5 Meg Ohm. Manually operated shorting switches 152-158 are provided for each of the resistors so that a combination of resistance values can be selected to set the time delay cycle in varied increments. With all switches 152-158 closed the time delay available from adjustment of trim pot 142 is 0 to 9 seconds. Selective opening of switches 152, 154 or 156 adds increments of 0.2 seconds to the time delay by adding increments of resistance. Switch 158 provides an increase of 6 seconds time delay when opened. The combination of four switches thus provides an overall delay range adjustment of from 0 to 15 seconds. For example, with switch 158 closed the selectable range is 0 to 9 seconds and with switch 158 open the selectable range is 9 to 15 seconds.

The resistors 152-158 are connected to a capacitor 160 as well as one input of an amplifier 162. The other lead of amplifier 162 is connected to a trigger potentiometer 164 for establishing a fixed reference voltage. The output from this amplifier is connected through a diode 166 into one input of an operational amplifier 168, the other input of which is connected with a trigger potentiometer 169. The output of amplifier 168 is directed into a NOR gate 170. The output of NOR gate 170 is connected with one input of a NOR gate 172, the output of which is connected through a resistor 174 with transistor 176. When switched to an on state, transistor 176 provides a connecting path from the 12 volt output of power supply 91 through buzzer 138 and manually operated switch 178 for activating the audible alarm.

A relay 179 is connected in parallel with buzzer 138. The relay can be connected with any desired equipment, e.g. pumps or remote alarms, which are to be activated or deactivated, as the case may be, simultaneously with the main alarm of buzzer 138.

A pulsator circuit 180 provides selectable pulsating operation of buzzer 138 by rapidly varying the amplitude of the audible alarm. The circuit 180 includes a manually operated switch 182 connected across a capacitor 184. One branch of the circuit is connected to the output of amplifier 172 through a resistor 186, and another branch is connected to the input of the same amplifier through series-connected amplifiers 188, 190 and resistors 192, 194.

Time delay circuit 140 disables the buzzer alarm circuit for a predetermined time delay following the point at which the vacuum level recovers, i.e. the absolute pressure drops, to the "Off" level established by adjustment of trim pot 134. At the time this "Off" level is reached amplifier 136 output moves low as described above so that the output of NOR gate 130 moves high when the input from NOR gate 109 is low, i.e. when either high or low vacuum conditions are sensed. This enables current to charge the circuit of capacitor 160. The rate of current flow, and therefore the delay cycle time, is dependent upon the resistance value as set by the switches 152-158. If by the end of the time delay the "High" or "Low" conditions are still being sensed and the vacuum is still above the "Off" setting then both inputs to NOR gate 130 are low so that the output remains high. One input of amplifier 162 compares time delay output value with the reference voltage from trigger potentiometer 164. When the input from the time delay circuit exceeds the trigger reference the output from amplifier 162 goes high for operation of the circuit which includes buzzer 138 in the manner described above. If by the end of the time delay the vacuum recovers to the normal range so that neither "High" or "Low" conditions are sensed, then one input to NOR gate 130 goes high and its output goes low. This permits capacitor 160 to rapidly discharge current through a diode 195 causing the input of amplifier 162 to stay below the trigger reference voltage so that the output of this amplifier goes low to disable the buzzer circuit.

After the "Off" level is reached the output signal from amplifier 136 is directed through inverting buffer 137 and resistor 139 to operate LED 90. Light from this LED can be used by the operator to determine the precise point at which adjustment of the "Off" point is reached thereby providing a more accurate method of determining the "Off" point than would be possible from listening to the audible alarm.

The alarm circuit includes a buzzer latch circuit comprising a manually operated switch 196 and capacitor 198 which are in parallel connection with a resistor 200 between ground and one input of operational amplifier 168. With switch 196 open the audible alarm of buzzer 138, following the time delay established by circuit 140, will sound continuously throughout the entire time that the transducer senses vacuum levels above or below the preset "High" and "Low" levels. With switch 196 closed the alarm of buzzer 138 will continue for a time period established by the circuit constant, e.g. 20 seconds, after the vacuum level returns to within the normal range. Thus, in the event the control circuit senses abnormal vacuum levels which persist beyond the time delay set by circuit 140, the audible alarm of buzzer 138 will sound for the 20 second period even if the vacuum level moves back within the normal range immediately following the time delay. This serves to latch the alarm on for the full 20 seconds. With this setting the operator will eventually be warned in the event that he is temporarily out of hearing range when the alarm initially goes off.

The use and operation of the invention will be explained in connection with the typical milking system installation of FIG. 1.

With the monitoring apparatus 70 connected to the vacuum line 43 as described in connection with FIG. 1 the initial circuit adjustments are made. With the circuit connected to the electrical power supply and the vacuum pump system turned off transducer 80 senses the low vacuum condition and yellow LED 88 is turned on by the circuit. The "range" trim pot 98 is initially set so that the circuit will monitor a 7" Hg. vacuum range, e.g. from 10" to 17" Hg.

To set the "High" vacuum warning level, the vacuum regulators 18, 20 are set to the highest vacuum warning level desired, which normally would be ½" Hg. vacuum above the desired vacuum level for milking. For example, if the milking vacuum level is to be 13.5" Hg. then the "High" vacuum warning level would be set at 14" Hg. With the regulators at this setting and vacuum pump 24 in operation the "High" trim pot 102 is manually adjusted until red LED 84 just comes on.

To set the "Low" vacuum warning level the regulators are set to the lowest vacuum warning leveled desired, which normally would be ½" Hg. below the desired milking level. For example, if the desired milking level is 13.5" Hg. vac. then the "Low" setting would be 13" Hg. With the regulators at this setting and the vacuum pump in operation the "Low" trim pot 114 is manually adjusted until yellow LED 88 just comes on.

The "Off" limit for automatic alarm operation is set by adjusting vacuum regulators 18, 20 to the level at and below which no alarm is desired, for example at 8" Hg. vac. With the regulators at this setting and the vacuum pump in operation trim pot 134 is manually turned until light 90 turns on. This trim pot is then turned slowly in the opposite direction until light 90 turns off.

The system recovery time delay is set at the desired value when the apparatus is initially installed and serves to prevent the audible alarm from sounding during initial vacuum buildup, i.e. the time span from the "Off" setting and the "Low" warning setting. To establish the recovery time delay setting the vacuum pump is initially turned off and time delay trim pot 142 turned counter clockwise to its full stop. With the vacuum system set for normal operation pump 24 is turned on and the operator notes the length of time until the alarm sounds. The vacuum pump is again turned off and the time delay trim pot adjusted clockwise approximately ⅛ turn. The vacuum pump is then turned on and the alarm time again noted. If the alarm does not sound the trim pot 142 is turned back counter clockwise and the pump turned on. This procedure is repeated until the alarm just barely sounds on vacuum buildup. Switch 182 can be opened or closed to either activate or deactivate buzzer pulsator circuit 180, as desired. Switches 152, 154, 156 are then used to add 0.2 second incremental increases in the time span. By selecting a single switch or combination of switches the time span can be increased from 0.2 seconds to 1.4 seconds in 0.2 second increments.

With the time delay set in the foregoing manner the alarm circuit will be disabled during initial vacuum buildup so that the alarm will not sound. If during any subsequent operation of the system there is any increase in this time span after the initial setting, the alarm will sound for a longer period of time as the buildup time increases. This serves to measure any deterioration in the vacuum recovery rate from that which existed when the monitoring system was installed and the original setting established. The length of alarm sound during system start up will thereby provide an indication to the operator of the degree to which recovery rate efficiency has dropped so that repair and maintenance of the vacuum system can be initiated at an early stage.

The chart of FIG. 4 plots vacuum level as a function of time during normal start-up of the vacuum system illustrated in FIG. 1. Following start-up of the vacuum pump the vacuum level begins to increase at time point 202 where pressure is atmospheric. The vacuum recovery follows the curve to the level set by the regulator of approximately 15" Hg. vacuum indicated at 204. Point 206 indicates shutdown of the pump with the drop off of vacuum following the curve 208 back to atmospheric pressure. The chart of FIG. 5 illustrates operation of the control circuit of the invention in two cases of high vacuum conditions occurring in the system. The trace line 210 plots vacuum level at about 15" Hg., with the vacuum beginning to increase at point 212. At point 214 the vacuum goes above 15.5" Hg. which is the "high" level set by trim pot 102. The control circuit responds as described above to turn red LED 84 on and activate the time delay circuit 140. In this example circuit 140 is set for a five second time delay such that the time delay ends at point 216. Prior to this point the vacuum returns to its normal 15" Hg. level so that the alarm circuit is not activated at the end of the time delay. Following this the vacuum level again starts to rise at point 218 exceeding 15.5" Hg. at point 220. This again activates red LED 84 and starts the five second time delay. The high vacuum condition continues beyond this time delay as indicated at point 222 so that the alarm circuit is turned on as indicated by tracing 224.

The chart of FIG. 6 illustrates operation of the control circuit during a low vacuum condition in the system. At point 226 the vacuum level begins to drop until reaching the "low" setting at point 228. The control circuit responds as described above to activate yellow LED 88 and begin the five second time delay, but the alarm circuit is not activated because the vacuum level returns to within the normal range at point 230 before completion of the time delay. At point 232 the vacuum level again drops so that the yellow LED and the time delay circuit are again activated. Following the five second time delay at point 234 the "low" vacuum level still persists so that the alarm is turned on by the circuit as indicated by the tracing 236.

The chart of FIG. 7 illustrates operation of the circuit during a slow vacuum recovery condition. Following start-up of the pump the vacuum level begins to rise from atmospheric at point 238. In this example with the initial recovery time delay set for 5½ seconds, the alarm is turned on because at the end of the time delay at point 240 the vacuum level has only reached point 242 which is below the normal range. This turns the alarm on as indicated by the tracing 244.

In the foregoing examples the buzzer latch circuit of switch 196 is not included so that the alarms are shown as switching off at an earlier time than would be the case with the latch circuit in effect.

While the foregoing embodiment is at present considered to be preferred it is understood that numerous variations and modifications may be made therein by those skilled in the art, and it is intended to cover in the appended claims all such variations and modifications as fall within the true spirit and scope of the invention.

What is claimed is:

1. Apparatus for monitoring vacuum conditions in a system employing vacuum, comprising the combination a control circuit including transducer means for sensing the level of the vacuum at a given location in the system and generating an output signal which is a function of the sensed level, a high vacuum level adjustment circuit for selectively establishing a first reference signal which is a function of a predetermined upper limit of vacuum in the system, a low vacuum level adjustment circuit for selectively establishing a second reference signal which is a function of a predetermined lower limit of vacuum in the system, comparator circuit means for comparing the output signal with the first and second reference signals, said comparator circuit means establishing a first control signal responsive to a predetermined relation between the output signal and first reference signal, said comparator circuit further establishing a second control signal responsive to a predetermined relation between the output signal and second reference signal, and indicator circuit means for signaling a high vacuum condition responsive to the first control signal and for signaling a low vacuum condition responsive to the second control signal.

2. Monitoring apparatus as in claim 1 in which the indicator circuit means includes alarm circuit means for signaling an alarm responsive to either of the first and second control signals, and time delay circuit means for disabling the alarm circuit for a predetermined delay time following initiation of the first and second control signals whereby continuation of the control signals longer than said delay time enables the alarm circuit for activating the alarm.

3. Monitoring apparatus as in claim 2 in which the alarm circuit means includes means for signaling an audible alarm responsive to the control signals.

4. Monitoring apparatus as in claim 2 in which the indicator circuit includes means for emitting light signals responsive to the first and second control signals to provide a visual warning of the respective high and low vacuum conditions.

5. Monitoring apparatus as in claim 2 in which the time delay circuit means includes means for discharging current at a rate which determines the time delay value, a resistance circuit for retarding the current discharge, and selectable means for varying the resistance value of the resistance circuit to vary the time delay.

6. Monitoring apparatus as in claim 5 in which the resistance circuit includes a plurality of resistors connected in series in the circuit, and the selectable means includes switch means for shorting selected combinations of the resistors.

7. Monitoring apparatus as in claim 2 in which the alarm circuit means includes means for selectively pulsing the amplitude of the alarm signaling.

8. Monitoring apparatus as in claim 1 including a remote control relay and means for actuating the relay responsive to either of the first and second control signals.

9. Monitoring apparatus as in claim 1 in which the control circuit includes an alarm circuit which signals an alarm responsive to either of the first and second control signals, an off adjustment circuit for selectively establishing a third reference signal which is a function of a predetermined off vacuum level below which the alarm circuit is disabled, another comparator circuit for establishing a third control signal responsive to a predetermined relation between the output signal and the third reference signal, and alarm-enable circuit means for enabling operation of the alarm circuit responsive to the third reference signal being at a value where the vacuum level in the system is above said predetermined off vacuum level.

10. Monitoring apparatus as in claim 9 in which the control circuit includes time delay circuit means for disabling the alarm circuit for a predetermined delay time following activation of the alarm-enable circuit.

11. Monitoring apparatus as in claim 9 in which the alarm circuit includes an audible alarm, and the off adjustment circuit includes another indicator circuit for visual signalling an alarm off condition responsive to the third control signal whereby the visual signalling provides a precision indication of the alarm off condition for setting of the vacuum level above which the alarm circuit is enabled.

12. Monitoring apparatus as in claim 6 in which the time-delay circuit includes circuit means for selectively varying the delay time for varying the time of vacuum recovery from said predetermined off vacuum level before the alarm circuit is enabled.

13. Monitoring apparatus as in claim 1 or 9 in which the control circuit includes an alarm latch circuit selectable between first and second operating modes, said alarm latch circuit in the first operating mode enabling continuous operation of said alarm circuit, said alarm latch circuit in the second operating mode terminating operation of said alarm circuit after a predetermined time from initiation thereof.

14. Monitoring apparatus as in claim 1 in which the control circuit includes means for selectively varying the magnitudes of the first and second comparison signals which are established by the adjustment circuits responsive to sensing of pressure by the transducer means whereby the respective upper and lower limits of vacuum levels are selectively varied.

15. Monitoring apparatus as in claim 1 in which the control circuit includes an additional indicator circuit including means for signaling a normal vacuum condition responsive to the absence of both first and second control signals.

16. Monitoring apparatus as in claim 1 in which the system employing the vacuum comprises a milking system including at least one milking machine operated from a source of vacuum, said transducer means is positioned to sense the level of vacuum from the source, and the indicator circuit includes means for signaling predetermined high and low vacuum conditions which are outside the optimum range of vacuum for optimum milking.

17. Monitoring apparatus as in claim 16 in which the means for signaling the high and low vacuum conditions includes light source means visible to an operator and which activates responsive to the respective first and second control signals.

18. Monitoring apparatus as in claim 17 in which the means for signaling the high and low vacuum conditions includes audible alarm means sensible to an operator and which activates responsive to the respective first and second control signals.

19. Monitoring apparatus as in claim 1 in which the control circuit includes selectively operable circuit means responsive to the first and second reference signals for selectively narrowing the upper and lower limits of vacuum at which the indicator circuit signals the respective high and low vacuum conditions.

* * * * *